Feb. 12, 1935.  W. M. UPP  1,991,070
ELECTRICAL GENERATING AND DISTRIBUTING SYSTEM
Filed July 26, 1932   2 Sheets-Sheet 1
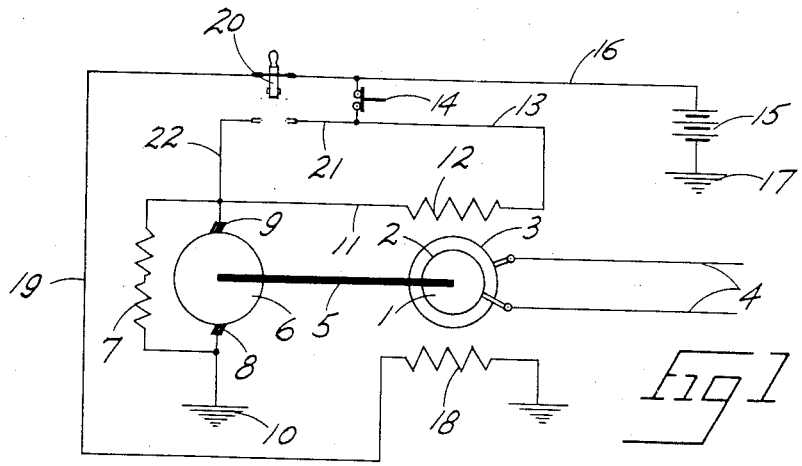
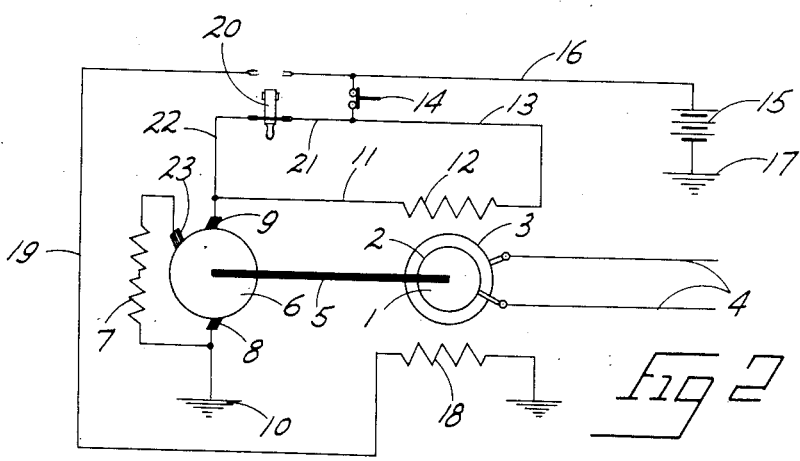
Inventor
WILLIAM M. UPP.
By Richey F. Watts
Attorney

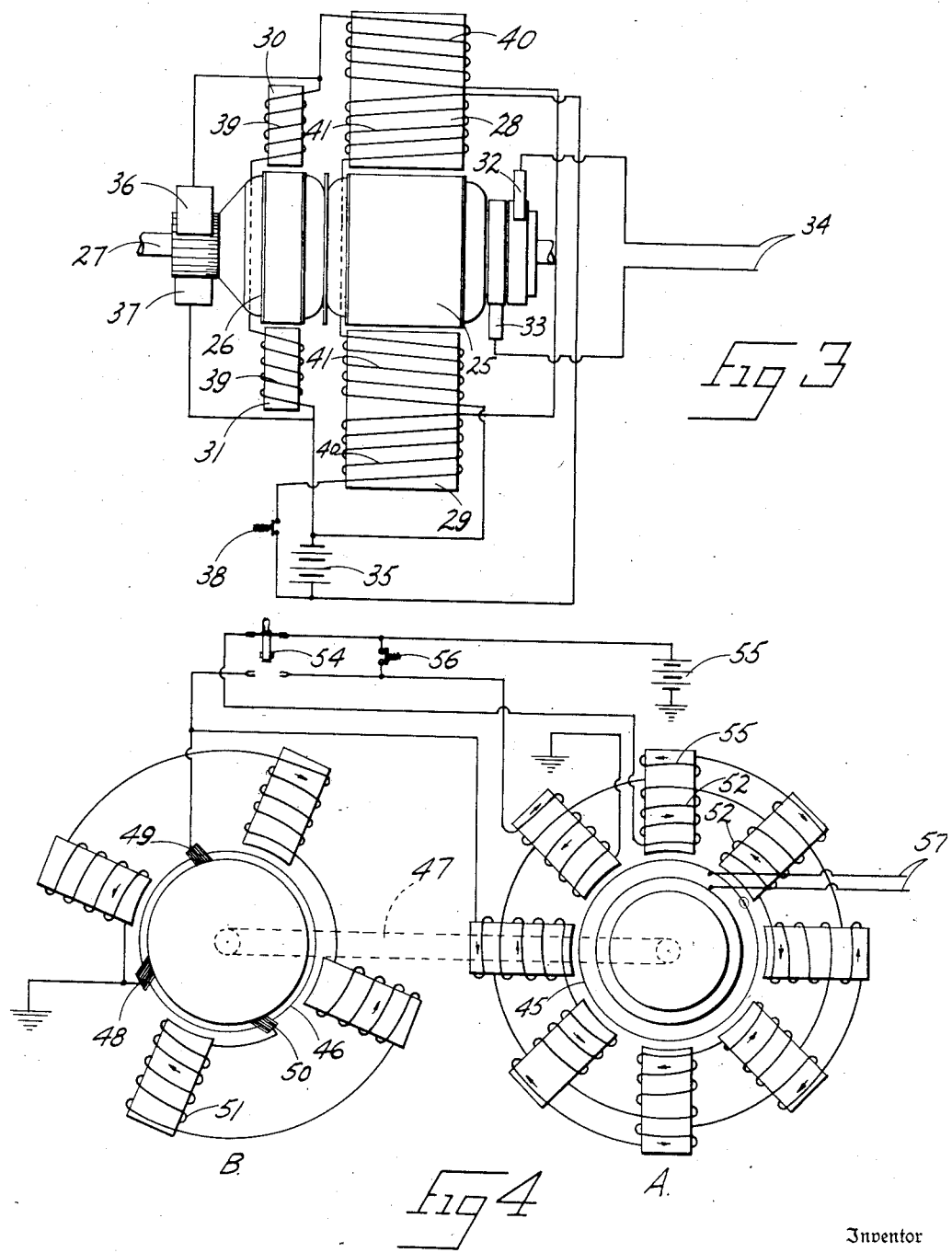

Patented Feb. 12, 1935

1,991,070

UNITED STATES PATENT OFFICE 1,991,070

ELECTRICAL GENERATING AND DISTRIBUTING SYSTEM

William M. Upp, Kansas City, Mo.

Application July 26, 1932, Serial No. 624,779

6 Claims. (Cl. 171—313)

This invention relates to a system of electrical distribution and more particularly to a distribution system which includes a direct current generator and an alternating current generator, the alternating current generator being adapted to supply a substantially constant voltage alternating current over a wide range of speed variation of the apparatus.

It has previously been proposed to mount an alternating current generator and a direct current generator on the same shaft, the direct current generator being adapted to supply the field excitation current for the alternator. In some of the developments in this art with which I am familiar a direct current generator has been provided with a constant field from an external source and has been supplied with a variable differential or opposing field from an auxiliary generator. In this type of generator the secondary field is arranged to oppose the constant field and thus as the speed of the apparatus is increased the effective field magnetization of the main generator is decreased, and, by properly proportioning the parts, the output voltage of the main generator may be maintained substantially constant over a wide range of speeds.

It is among the objects of the present invention to provide an improved apparatus of the general type above referred to which is particularly adapted for use in connection with automotive vehicles for supplying a constant voltage alternating current which is adapted to operate alternating current radios, electrical refrigeration apparatus, or any other equipment which requires a substantially constant voltage for proper operation. As it is most convenient to drive a generator which is mounted on an automotive vehicle from the vehicle engine, it is important that the output voltage be unaffected by changes in engine speed.

The usual automotive vehicle is equipped with a storage battery which is maintained in charged condition by a direct current generator driven from the engine. In my arrangement I include, in a single unitary generator construction, a direct current generator which is adapted to maintain the vehicle storage battery in properly charged condition and at the same time to supply the differential field of a constant voltage alternator with a current which varies in proportion to the speed at which the unit is driven. In my arrangement the constant field of the alternator is supplied by the same storage battery that is charged by the direct current portion of the apparatus and thus the necessity for separate means for exciting the constant field of the output generator is eliminated.

Other objects of my invention are: the provision of an electrical distribution system and means for controlling the same whereby the apparatus may be utilized to produce a constant voltage current over a wide range of speed and, when desired, the constant voltage portion of the apparatus may be completely cut out and the remaining portion of the generator will act to charge the storage battery in the usual manner; the provision of a combination alternating current and direct current generator having alternating current and direct current armatures mounted on the same shaft and having the alternating current and direct current poles so arranged that they will not interfere electrically with each other; the provision of a compact, light weight generator unit for automotive vehicles which is adapted to maintain a storage battery in properly charged condition and at the same time deliver an independent constant voltage current.

The above and other objects of my invention will appear from the following description of several forms thereof reference being had to the accompanying drawings, in which—

Figure 1 is a diagrammatic illustration of an embodiment of my improved electrical distribution system which is particularly adaptable for use on automotive vehicles.

Figure 2 is a diagrammatic illustration of a system generally similar to that illustrated in Figure 1 but in which the D. C. generator is of the third-brush type commonly used on automobiles.

Figure 3 is an illustrative view showing my invention as applied to a combined direct current and alternating current generator, each of said generators having two poles, the system including a storage battery arranged in accordance with my preferred practice.

Figure 4 is an illustrative view of an electrical distribution system incorporating my invention in which an alternating current generator having eight poles is combined with a direct current generator having four poles, the poles of the alternator and direct current generator being arranged in staggered relation.

Referring now to Figure 1, the alternating current generator 1 is equipped with the usual slip rings 2 and 3 from which extend the line connections 4. It will be understood that any desired apparatus or equipment may be connected into the line 4 in any desired manner.

Mounted on the same shaft 5 as the alternating current generator 1 is a shunt wound direct current generator 6. As the alternating current and direct current generators are mounted on the same shaft they will rotate at the same speed. Shaft 5 may be suitably driven from the vehicle engine and therefore the speed of the generators will vary with the speed of the engine.

The D. C. generator 6 is equipped with a shunt field winding 7 which is connected across the brushes 8 and 9. The brush 8 is grounded at 10 and a conductor 11 extends from the brush 9 to the differential field coil 12 of the alternator 1. From the coil 12 a conductor 13 extends to the relay 14. From the relay 14 a connection is completed to the storage battery 15 by the conductor 16. The opposite side of the storage battery 15 is, in the arrangement shown, grounded as indicated at 17.

The A. C. generator is equipped with a constant field coil 18 which may be connected in parallel with the battery 15 by the conductor 19, the switch 20 and the conductor 16 on one side of the storage battery and through the ground to the other side of the battery. It will be seen that the field coil 18 will be excited at a constant and unvarying rate by the battery 15.

The switch 20, in the position shown, is adapted to complete the connections between the conductor 19 and the conductor 16. When it is in its opposite position it is adapted to complete a connection between the conductors 21 and 22. The effect of such connection will be later explained.

The operation of the above described apparatus is as follows:

When the vehicle engine is started the shaft 5 starts to rotate and with it the armatures 1 and 6 of the A. C. and D. C. generators respectively. The cut-out 14 is a magnetically actuated cut-out of the usual type and is adapted to break the connection between the battery 15 and the D. C. generator whenever the D. C. generator is producing a voltage less than the battery voltage. Thus, when the apparatus is first started the cut-out 14 will be open. However, as soon as the D. C. generator reaches a speed at which it will generate a higher voltage than the voltage of the battery 15 the cut-out 14 will be closed and the circuit will be completed from the brush 9 through the differential alternating current generator field 12 and the cut-out 14 to the battery 15. From the battery 15 the circuit is completed through the ground to the brush 8 of the D. C. generator. At the same time, of course, the shunt field 7 of the D. C. generator will be energized in well known manner.

The A. C. armature 1 rotates in a magnetic field which is the result of the combined effects of the constant field coil 18 and the variable or differential field coil 12. As the battery 15 opposes the D. C. generator 6 the differential field 12 will be ineffective until the D. C. generator is generating a voltage greater than the battery voltage. This differential field is wound or arranged in such a manner that it opposes the constant field 18 and thus, as the speed of the shaft 5 increases, from the point where the relay 14 closes, the strength of the field 12 will be increased substantially in proportion to the increase in speed of the shaft 5. This increase in strength of the field 12 will oppose the field 18 and consequently cut down the effective field strength of the A. C. generator. As this cutting down of the effective field strength of the A. C. generator is substantially in direct proportion to the increase in speed, it will be understood that the voltage output of the A. C. generator to the line 4 will remain substantially constant.

In designing the apparatus I preferably proportion the parts so that when the shaft 5 rotates at a predetermined rate of speed, for example, 1000 R. P. M. the D. C. generator voltage will reach a point high enough to just overcome or balance the voltage of the battery 15 and the cut-out 14 will complete the circuit between the battery and the D. C. generator. At this speed the A. C. generator is preferably designed so that it will give the desired rated voltage, for example 110 volts. This rated voltage output at 1000 R. P. M. will be created by the constant field 18 as, at this speed, the differential field 12 is preferably not energized to any appreciable degree. As the speed of the unit is increased above 1000 R. P. M. the field strength of the differential field 12 will be increased by the D. C. generator and the storage battery 15 will also be charged. As above explained the increase of the strength of the field 12 decreases the strength of the total effective field of the A. C. generator and the output voltage of the A. C. generator will be maintained substantially constant at 110 volts.

If it is desired to disconnect the A. C. apparatus it is only necessary to throw the switch 20 from the position shown in Figure 1 into its other position (see Figure 2) where it connects the conductors 21 and 22 and breaks the connection between conductors 16 and 19. When in this position it will be seen that the differential field coil 12 will be short circuited and the constant field coil 18 will be disconnected from the battery 15. At the same time the battery 15 will be connected directly across the brushes of the D. C. generator through the conductor 22, switch 20, conductor 21, cut-out 14, conductor 16 to the battery and back to brush 8 through the ground. When the switch 20 is in the above noted position the A. C. generator will be rendered entirely inoperative and the D. C. generator will operate in the usual manner to charge the storage battery 15. However, the D. C. generator will also charge the storage battery 15, although at a lower rate, when the switch 20 is in the position shown in Figure 1 and the A. C. generator is operating to deliver a constant voltage current.

In Figure 2, I have illustrated an arrangement which is identical with that shown in Figure 1 with the exception that the shunt field 7 of the D. C. generator is connected to a third brush 23 on the commutator. The object of this arrangement is to secure the benefits of the well known third brush arrangement which include easy adjustability of the charging rate of the generator, economical construction, effective control of the shunt field current, etc.

The generating and distribution systems illustrated in Figures 3 and 4 diagrammatically show several ways in which my invention may be incorporated in practical apparatus. It will, of course, be understood that the electrical characteristics of the various field coils, armatures, etc. must be properly proportioned to secure the desired characteristics in the apparatus.

In Figure 3 the armature 25 of the alternator and the armature 26 of the direct current generator are mounted on the same shaft 27 which may be driven from a variable speed prime mover in any suitable manner. The alternator end of the unit is provided with two poles 28 and 29 and the direct current end with two poles 30 and 31. In Figure 3 the D. C. poles 30 and 31 are shown in the same plane as the alternator poles 28 and 29 but in practice I prefer to arrange the poles 30 and 31 so that they lie in a plane at right angles to a plane through the poles 28 and 29. By thus spacing the poles of the D. C. generator substantially midway between the poles of the alternator I eliminate interference between the magnetic fields of the A. C. and D. C. ends of the apparatus and prevent harmful heating and consequent reduction of the efficiency of the unit. In generators intended for use on automotive vehicles it is important that the unit be made as compact as possible so that it will occupy a minimum of space and by offsetting or staggering the A. C. and D. C. poles as above noted a balanced condition is obtained whereby neither of the A. C. poles immediately adjacent a D. C. pole will affect or influence the magnetic field set up by the D. C. pole and similarly none of the A. C. poles will be affected by the adjacent D. C. poles. The brushes 32 and 33 of the alternator are connected directly to the line 34 and it will be noted that there is no connection from the line 34 to any of the field coils of the generating unit. Thus the operation of the alternator is entirely independent of the line load. The connections between the storage battery 35, the brushes 36 and 37 of the D. C. generator and the field coils of the A. C. and D. C. portions of the apparatus are the same as illustrated in Figure 1, with the exception that the ground connections are eliminated and the circuits completed by suitable wires. Also the switch 20 of Figure 1 is omitted in the apparatus of Figure 3. The omission of switch 20 does not change the characteristics of the apparatus but makes it impossible to cut the A. C. end of the device. It will be understood that the apparatus of Figure 3 is intended to generate a constant voltage alternating current whenever it operates at a speed great enough to close the relay 38 which corresponds to and has the same functions as relay 14 in Figure 1. In tracing the circuits of the apparatus in Figure 3 it will be noted that the shunt field coils 39 of the D. C. generator are connected directly across the brushes 36 and 37. The differential field coils 40 of the alternator are connected in series with the storage battery 35 across the brushes 36 and 37 of the D. C. generator and the constant field coils 41 of the alternator are energized by the storage battery 35 and are arranged in parallel relation therewith. It will be understood that the various field coils are merely diagrammatically illustrated and that the number of turns, size of wire used, etc. will be determined by the particular purposes for which the apparatus is designed.

In Figure 4 I have illustrated an alternator A having eight poles and a D. C. generator B having four poles, the armature 45 of the alternator and the armature 46 of the D. C. generator both being mounted on and rotated with the shaft 47. For purposes of illustration the poles of the A. C. and D. C. generators are shown in side by side relation and it will be noted that the poles of the D. C. generator are not directly aligned with the poles of the A. C. generator but are spaced midway between the A. C. generator poles.

The circuit connections shown in Figure 4 are the same as those shown in Figure 2. The generator B is provided with two main brushes 48 and 49 and a third brush 50. The field coils 51 of the generator B are connected in shunt across the third brush 50 and the main brush 48 in the usual manner. A constant field coil 52 and a differential coil 53 is wound on each of the eight pole pieces of the alternator B. When the switch 54, which corresponds to switch 20, of Figures 1 and 2, is in the position shown, the differential coils 53 are connected across the main brushes 48 and 49 of the D. C. generator B in series with the storage battery 55. As has previously been explained the differential coils 53 will only be energized when the relay 56 is closed and the D. C. generator is generating a voltage great enough to overcome the voltage of the opposing storage battery 55. The constant field coils 52 are connected directly across the storage battery 55. The output of the generator A is taken off by the line conductors 57.

Referring back to Figures 1 and 2, by placing the storage battery 15 in series with the differential field 12 of the alternator 1 and across the brushes of a D. C. generator of the shunt type I have been able to secure a very effective regulation of the strength of the differential field 12 and at the same time maintain the battery 15 in properly charged condition. The battery 15 is also used to supply current for energizing constant field 18 of the alternator and, when the apparatus is installed on an automotive vehicle, the same battery may be used to supply the lighting, starting and ignition current in the usual manner. Thus, with my unitary apparatus and a single storage battery I have provided a generator arrangement for variable speed installations which will give a constant voltage output over a wide range of speed and which will also serve the purpose of charging the storage battery. By inserting the switch 20 in the circuit, as shown, it is possible to instantaneously cut out the A. C. end of the apparatus and use the D. C. generator in the usual manner. My apparatus is particularly adapted for use in automobiles and aeroplanes in which weight and size are very important factors. Moreover, it is susceptible to exceedingly economic construction and as it is entirely automatic in operation it requires no adjustment or attention after its initial installation.

Although I have illustrated and described in some detail certain forms of my invention and have shown several diagrammatic illustrations of electrical distribution systems incorporating my invention, it will be understood by those skilled in the art that variations and modifications may be made in the specific arrangements shown and described and that the parts may be proportioned and designed to give the desired characteristics to the apparatus without departing from the spirit of my invention. For example, a D. C. generator might be substituted for the alternator to deliver a constant voltage direct current to the line. I do not, therefore, limit myself to the specific forms of my invention illustrated and described, but claim as my invention all embodiments and modifications thereof coming within the scope of the appended claims.

I claim:

1. In combination in an electrical distribution system, an alternating current generator, a direct current generator adapted to rotate at a speed proportional to the speed of the alternating current generator, variable speed means for driving said alternating and direct current generators, a storage battery connected to said direct current generator and adapted to be charged thereby, a cut-out in the connection between said battery and said direct current generator whereby said connection will be completed only when said generator is generating a voltage equal to or greater than the storage battery voltage, a constant field coil for said alternating current generator adapted to be connected in parallel to and energized by said storage battery, a differential field coil for said alternating current generator, said differential field being connected in series with said storage battery and the direct current generator and a shunt field winding for said direct current generator, said differential field being adapted to be energized to oppose said constant field when said cut-out is closed and being variable substantially in direct proportion to the speed of the direct current generator.

2. In combination in an electrical distribution system, an alternating current generator, a direct current generator adapted to rotate at a speed proportional to the speed of the alternating current generator, variable speed means for driving said alternating and direct current generators, a storage battery connected to said direct current generator and adapted to be charged thereby, a cut-out in the connection between said battery and said direct current generator whereby said connection will be completed only when said generator is generating a voltage equal to or greater than the storage battery voltage, a constantly excited field coil for said alternating current generator adapted to be connected in parallel to and energized by said storage battery, a differential field coil for said alternating current generator, said differential field being connected in series with said storage battery and the direct current generator, a shunt field winding for said direct current generator, said differential field being adapted to oppose said constant field and being variable substantially in direct proportion to the speed of the direct current generator, and switch means adapted when in one position to connect said constant field coil in parallel with the storage battery and said differential field coil in series with the storage battery and the armature of the direct current generator and, when in its other position, to short circuit the differential field coil and break the connection between said constant field coil and said storage battery.

3. In apparatus of the class described, a main generator, means for driving said main generator at variable speeds, an auxiliary battery charging and main generator exciting generator, means for driving said auxiliary generator at speeds proportionate to the speed of the main generator, a storage battery electrically connected to said auxiliary generator and adapted to be charged thereby, a constant field coil for said main generator connected in parallel with said storage battery and adapted to be energized thereby, a differential field coil for said main generator connected in series with said storage battery and said auxiliary generator, said auxiliary generator being adapted to vary the field strength of said differential coil in substantially direct proportion to the speed of the auxiliary generator and a cut-out, responsive to the output of the auxiliary generator and adapted to complete the connection between said auxiliary generator, said differential field and said battery only when the output voltage of said auxiliary generator is equal to or greater than that of said battery.

4. In apparatus of the class described, a main generator, means for driving said main generator at variable speeds, an auxiliary battery charging and main generator exciting generator, means for driving said auxiliary generator at speeds proportionate to the speed of the main generator, a storage battery connected to said auxiliary generator and adapted to be charged thereby, a constant field coil for said main generator connected in parallel with said storage battery and adapted to be energized thereby, a differential field coil for said main generator connected in series with said storage battery and said auxiliary generator, said auxiliary generator being adapted to vary the field strength of said differential coil in substantially direct proportion to the speed of the auxiliary generator, and switch means adapted when in one position to connect said constant field coil to said battery and said differential field coil in series with said generator and said battery and when in another position to short circuit said differential field coil and disconnect said constant field coil from said battery.

5. In apparatus of the class described, a main generator, means for driving said main generator at variable speeds, an auxiliary battery charging and main generator exciting generator, means for driving said auxiliary generator at speeds proportionate to the speed of the main generator, a storage battery connected to said auxiliary generator and adapted to be charged thereby, a constant field coil for said main generator connected in parallel with said storage battery and adapted to be energized thereby, a differential field coil for said main generator connected in series with said storage battery and said auxiliary generator, said auxiliary generator being adapted to vary the field strength of said differential coil in substantially direct proportion to the speed of the auxiliary generator and a cut-out, responsive to the output of the auxiliary generator, and adapted to complete the connection between said auxiliary generator, said differential field and said battery only when the output voltage of said auxiliary generator is equal to or greater than that of said battery, and switch means adapted when in one position to connect said constant field coil to said battery and to simultaneously connect said differential field coil in series with said generator and said battery and when in another position to short circuit said differential field coil and disconnect said constant field coil from said battery.

6. In apparatus of the class described, a main generator, an auxiliary battery charging and main generator exciting generator, means for driving said generators at proportional speeds, a storage battery electrically connected to said auxiliary generator and adapted to be charged thereby, a constant field coil for said main generator electrically connected to and adapted to be energized by said storage battery, a differential field coil for said main generator electrically connected in series with said storage battery and said auxiliary generator, and switch means adapted when in one position to connect said constant field coil to said battery and said differential field coil in series with said battery and said auxiliary generator and when in another position to short circuit said differential field coil and disconnect said constant field coil from said battery thereby rendering said main generator inoperative while maintaining the charging connections between said auxiliary generator and said battery.

WILLIAM M. UPP.